Aug. 3, 1948.
E. T. LAYNG
2,446,426
SYNTHESIS OF HYDROCARBONS WITH
SULFUR CONTAINING CATALYST
Filed March 1, 1946
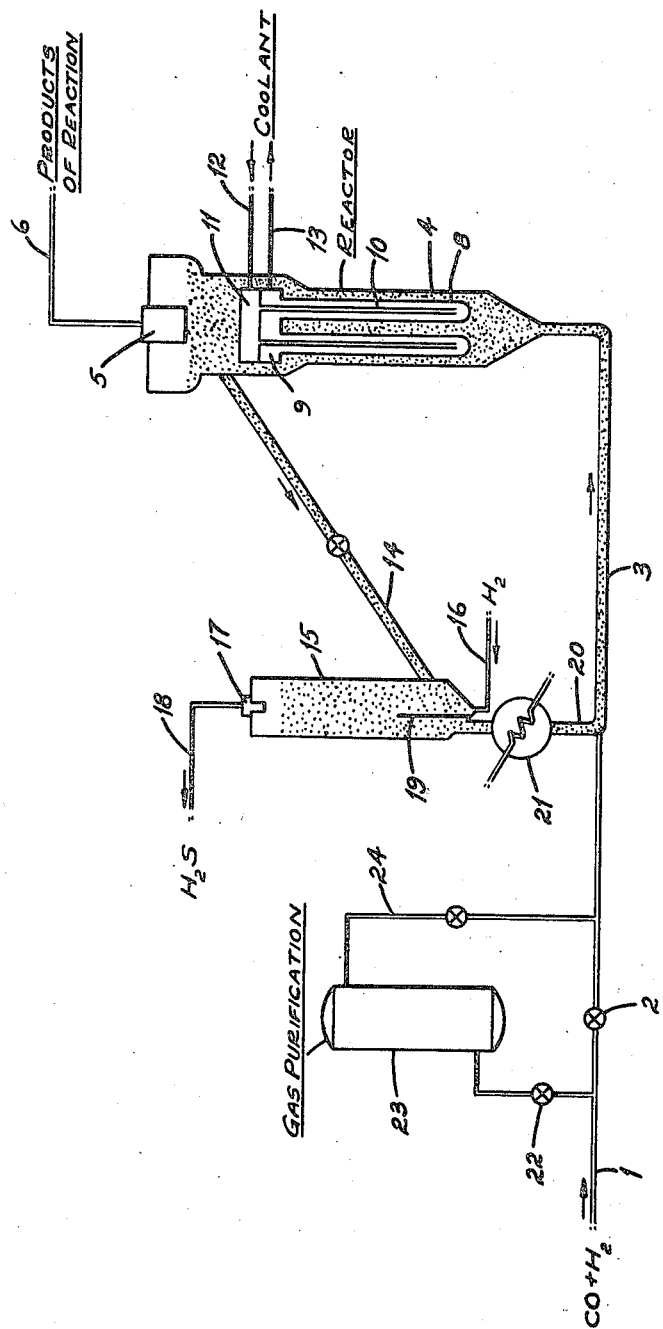
INVENTOR
EDWIN T. LAYNG
BY
ATTORNEY Patented Aug. 3, 1948

2,446,426

UNITED STATES PATENT OFFICE 2,446,426

SYNTHESIS OF HYDROCARBONS WITH SULFUR CONTAINING CATALYST

Edwin T. Layng, New York, N. Y., assignor to Hydrocarbon Research, Inc., New York, N. Y., a corporation of New Jersey Application March 1, 1946, Serial No. 651,291

8 Claims. (Cl. 260—449.6)

This invention relates to the catalytic conversion of carbon monoxide and hydrogen into hydrocarbons, oxygenated compounds and the like.

More specifically, the present invention contemplates operation of the foregoing conversion in the presence of an iron catalyst while maintaining conditions which favor the production of by-product water vapor in lieu of the usual large quantities of $CO_2$. While the synthesis of hydrocarbons from carbon monoxide and hydrogen in the presence of a cobalt or nickel catalyst has been successful, the use of the iron catalysts has been somewhat limited primarily due to a pronounced tendency to transform carbon monoxide into carbon dioxide. Thus the tendency of the process when operating with an iron catalyst is to follow the reaction: $H_2 + 2CO = CH_2 + CO_2$ rather than the theoretical reaction characteristic of the nickel or cobalt contact masses represented as follows: $2H_2 + CO = CH_2 + H_2O$. In certain cases it has been observed that 30 to 40% of the carbon monoxide charged to a reactor containing iron catalyst has been converted to carbon dioxide. This represents an undesirable utilization of the original fuel used in operating the process.

It has been discovered in accordance with the present invention that when operating with an iron catalyst the aforementioned disadvantage can be completely or largely overcome by maintenance of the catalyst at a sulfur content suitable to inhibit the production of carbon dioxide but in insufficient quantity to prevent the desired hydrocarbon synthesis. In fact, it has been found that when operating in accordance with the present invention to maintain the sulfur content of the catalyst at the predetermined optimum level, the yield of liquid hydrocarbons is also improved and the product tends to assume a more unsaturated character with a somewhat greater molecular weight.

This is particularly surprising in view of the fact that the presence of sulfur has, substantially since the inception of hydrocarbon synthesis process, been considered to be highly detrimental to the reaction. Thus in the catalytic reduction of carbon monoxide by hydrogen it has been accepted that a rigid purification of the feed gases is necessary to prevent poisoning of the catalyst and it has been stated that the sulfur content of the reaction gases supplied to the contact mass must not exceed 0.2 gm. per 100 cubic meters. While various maximum sulfur concentrations in the feed gas have been found usable, in each instance it has been noted that for any reasonable period of catalyst life the sulfur content of the feed gases must be maintained as low as possible. To this end numerous methods have been employed for removing organic as well as inorganic sulfur.

While it is not intended that the present invention be limted by any concept or theory made herein for purposes of better understanding, it is believed that the effect of the sulfur upon the catalyst is to suppress the propensity of an iron catalyst to promote the reaction:

$$H_2 + 2CO = CH_2 + CO_2$$

without material detriment to, and even with some improvement of, the carbon monoxide reduction by which the desired hydrocarbons are produced.

More specifically, the invention contemplates the predetermined introduction of sulfur into the iron catalyst in a proportion suitable to accomplish the desired purposes, and the maintenance of the sulfur content at substantially optimum level throughout the reaction without further material increase or decrease.

This may be accomplished in a variety of ways. When using a sulfur-free synthesis gas sulfur may be included in predetermined amount in the catalyst by the addition of suitable sulfur compounds during its manufacture, the optimum proportions being determined by comparative tests of varying samples. Alternatively it is possible to utilize a sulfur-containing feed gas which would normally tend to increase the sulfur content of the catalyst, with frequent regeneration to remove sulfur accumulation and maintain the catalyst within the optimum range. Such procedure may be applied to operations utilizing the fixed bed type of catalyst or any other type of contact mass.

It is preferred, however, to operate with a catalyst mass comprising powdered iron in a state of dense phase fluidization within a vertical reaction zone through which the reactants rise under conditions of flow effective for the fluidization of the catalyst mass while introducing the sulfur into the catalyst through the medium of the reactant gases and thereafter, when the optimum addition has been made, suitably maintaining such condition.

Where the feed gas unavoidably contains sulfur this may be accomplished by continuously subjecting the catalyst to controlled partial regeneration, preferably in a separate regeneration zone, whereby the effective sulfur content is maintained at the required level. Where the feed gas available for use after attainment of optimum conditions contains no sulfur, regeneration is not necessary although periodic regeneration and resulfurization may be beneficial.

More specifically, in accordance with a preferred embodiment of the present invention, the synthesis feed gas containing carbon monoxide and hydrogen and sulfur in gaseous or vaporous form in predetermined proportions is continuously introduced into the lower portion of a vertical reaction vessel containing a mass of catalyst comprising, for example, iron powder of about 100 to 400 mesh and having such particle size distribution as to maintain uniform fluidization throughout the vertical dimension of the reactor. The reactants are caused to rise through the mass under conditions of flow to maintain the catalyst in a state of dense phase fluidization such as described for example in "Transactions of American Institute of Chemical Engineers," volume 41, page 19 et seq. (1945). The fluidized reaction mass is maintained under elevated temperature and pressure such that there is a substantial yield of hydrocarbons in the products of reaction, discharged from the upper portion of the reaction zone.

Synthesis gas normally contains minor portions of gaseous, organic and/or inorganic sulfur compounds, dependent upon its method of manufacture, and is accordingly subjected to purification prior to introduction to hydrocarbon synthesis. In accordance with the present invention it is preferred to introduce initially a feed gas having relatively high sulfur content in excess of that previously considered proper, and up to as high as 0.5 molal-% sulfur (determined on the basis of $H_2S$) of the total feed gas. After the initial run-in period, the production of desired hydrocarbons in the reactor will proceed, with a decreasing proportion of carbon dioxide in the effluent gases and with an appreciable increase in the molecular weight and degree of unsaturation of the hydrocarbon product produced, until a point is reached at which these effects commence to diminish and disappear and poisoning of the catalyst with respect to the production of hydrocarbons begins to set in. It is just prior to this point that use of the sulfur-containing feed gas is terminated and in lieu thereof is substituted a synthesis feed gas free of sulfur or, where such procedure is not attainable, a feed gas subjected to rigid purification. In the latter case, the present invention contemplates continuous or intermittent treatment of the catalyst mass to maintain continuing optimum sulfur content. To this end, a portion of the catalyst may be continuously withdrawn from the reactor, treated to lower the sulfur content and continuously returned to the reaction zone all at a rate adjusted to hold the contact mass within optimum range of sulfur content.

It is also possible to operate continuously with a synthesis feed gas otherwise normally considered to have a rather high sulfur content, provided that the catalyst is continuously recycled through the aforementioned purification zone at a rate suitable to prevent net accumulation of sulfur in excess of optimum.

Reference will now be made to the accompanying drawing which illustrates one preferred method of practicing the present invention.

Carbon monoxide and hydrogen, advantageously though not necessarily, in the ratio of about two mols of hydrogen to one mol of carbon monoxide are conducted from a source not shown through pipe 1 and valve 2 into a catalyst conduit 3 leading to the bottom of reactor 4.

The reactor 4 comprises a vertical vessel containing a mass of powdered synthesis catalyst comprising iron powder and the reactants rise through the catalyst powder with sufficient velocity to maintain a state of dense phase fluidization. The upper portion of the reactor 4 is advantageously enlarged to provide a settling space for catalyst particles which become entrained in the gases leaving the fluidized mass. These gases and vaporous products of reaction pass through filter element 5 and outlet pipe 6 to a means not shown, for recovery, utilization and/or further treatment of the products of reaction. Filter element 5 may be any suitable device such as porous refractory material, for example Alundum, adapted to pass the gaseous and vaporous products while retaining entrained catalyst particles within the reactor.

In view of the highly exothermic nature of the catalytic reaction, internal cooling means within the reactor is provided, comprising a plurality of tubes 8 immersed in the catalyst mass, closed at the lower ends, and with their upper ends terminating in chamber 9. Each tube 8 surrounds an inner concentric tube 10, open at its lower end and communicating at its upper end with chamber 11. In operation a suitable heat carrier fluid such as water, injected from a source not shown through pipe 12, flows downward through chamber 11, through the inner tubes 10 and rises in the annular spaces between the tubes 8 and 10 in indirect heat exchange relationship with the fluidized mass of powdered catalyst and the reactants surrounding tubes 8. The heat carrier fluid or the vaporous products thereof after evaporation are discharged through pipe 13.

Referring again to the reactor 4, provision is made for continuously removing catalyst powder through a conduit 14 for discharge into a regeneration tower 15. It is further contemplated that where desirable a suitable stripping gas may be passed up through conduit 14 to promote the removal of adsorbed and absorbed products from the catalyst.

Removal of all or part of the sulfur content of the catalyst is advantageously effected in the tower 15 by subjecting the catalyst powder to intimate contact with hydrogen, supplied through a pipe 16 from a source not shown and preferably passed upwardly through the mass of catalyst in the tower 15 at a rate sufficient to promote dense phase fluidization. A filter element 17 in the upper portion of the tower similar to the aforementioned filter element 5 permits passage of the effluent gases, free from entrained catalyst, through the discharge vent or pipe 18 for recovery or further treatment.

It is to be understood that the catalyst powder in the tower 15 is to be maintained at a temperature suitable for reaction of hydrogen with the sulfur content of the mass, advantageously in the range of from 500 to 1000° F., and to this end where the residual heat within the catalyst supplied through conduit 14 plus that resulting from the exothermic action is insufficient or excessive, suitable heating or cooling means not shown may be provided in tower 15. It will be evident from the present disclosure that use and character of the heating or cooling means will be primarily dependent on the amount of sulfur contained in the feed gases to the synthesis reactor.

A portion of the treated catalyst powder accumulates behind the baffle 19 in the lower portion of the tower 15 and is withdrawn through conduit 20 which communicates through heat exchanger 21 with the previously mentioned conduit 3. The heat exchanger 21 may suitably lower the temperature of the catalyst to any desired value below the temperature prevailing in the reactor 4 in the interest of maintaining the optimum reaction temperature therein.

It is particularly important to note that the synthesis feed gases supplied through the pipe 1 initially contain a substantial proportion of sulfur compounds sufficient to promote accumulation of sulfur in the contact mass of the reactor 4 and preferably, where rapid approach to equilibrium operation is desired, contain a substantial proportion, in the order of 0.5 molal-% (as $H_2S$) of the entering gases. After the initial period of startup and the initiation of the production of hydrocarbons containing two or more carbon atoms, careful observation of the reaction products discharged through pipe 6 will disclose a progressive decrease in the net production of carbon dioxide formed in the reaction, and a relative increase, in lieu thereof, of water vapor. It will further be observed that the molecular weight of the hydrocarbon product and its degree of unsaturation will increase somewhat until a stage is reached where the proportion of sulfur accumulation upon the catalyst initiates a reversal of the foregoing effects and a general poisoning of the catalyst against the synthesis reaction. Approach to this condition can be readily determined by observation of the reaction products and by experience with the operation. Thus, while optimum yields, suppression of carbon dioxide formation and character of the product may vary with the specific type of catalyst and other conditions of operation, when operating with catalyst of uniform initial character and under the same conditions of temperature, pressure and the like, the approach to the optimum conditions is readily determinable from the nature of the products produced.

When the foregoing optimum conditions of operation have been reached the use of relatively high sulfur synthesis gas is terminated and there is substituted a synthesis feed which is relatively low in sulfur. While a sulfur free or rigidly purified synthesis gas may be substituted for that initially introduced through the pipe 1, there is disclosed in the drawing an alternative arrangement which permits the use of the originally mentioned feed gas. Thus suitably valved branch pipe 22 communicating with the pipe 1 leads to a gas purification system 23 adapted for removing of both organic and inorganic sulfur compounds, the sulfur free effluent being reconducted into the conduit 1 beyond the valve 2 through valved pipe 24. The purification system 23 while disclosed only symbolically may comprise any of the well known sulfur purification plants or combinations thereof among which are the commercial iron oxide system for removing hydrogen sulfide or the Girbotol Process.

It is advantageous with the valve 2 closed and the incoming gas passed through the purification system 23, to effect as great a sulfur removal as possible, since, with a negligible quantity in the feed, the recirculation and sulfur purification of the catalyst carried out in the regeneration zone 15 may be reduced to a minimum. On the other hand, with a reasonably small sulfur contamination of the feed gas, the regeneration system may be operated to continuously withdraw catalyst from the reactor 4, effect a suitable removal of sulfur in the tower 15, and return the catalyst to the reaction zone through the pipe 3.

It will be understood from the foregoing that recirculation of the catalyst is preferably restricted to a degree just sufficient to maintain the optimum sulfur content in the reaction zone which again is dependent upon the maintenance of the product yield and the minimization of net $CO_2$ formation, reflected by the products from pipe 6. It is important to note that the present invention has the additional advantage that it is not strictly limited to the maintenance of extremely minute sulfur contamination of the synthesis feed gas but may be operated with what would ordinarily be considered an unduly high sulfur content so long as the capacity of the tower 15 for treatment of catalyst is not exceeded and is sufficient to maintain catalyst in the reactor 4 within the necessary range of sulfur content.

In accordance with one illustrative embodiment of the present invention, synthesis gas containing hydrogen and carbon monoxide in a molar ratio of about 2.0 and also containing about 14% diluent gases ($CH_4$, $N_2$ and $CO_2$) and 0.4 molal-% sulfur (determined as $H_2S$) is passed into a reactor containing fluidized, catalytic iron powder substantially all of which passes through a 200 mesh screen and about 85% of which passes through a 325 mesh screen. This catalyst contains 2 to 3% of potassium oxide ($K_2O$) and alumina ($Al_2O_3$). The catalyst mass is maintained at a uniform temperature of 600° F. under conditions of good dense phase fluidization, and at a pressure of 200 p. s. i. gauge. The effluent from the reactor at the start contains 30 to 40% $CO_2$. After a period of about eight hours the proportion of carbon dioxide contained in the effluent stream will have been reduced to a minimum, say below 5%, and further sulfur addition to the catalyst mass becomes detrimental.

At this time, a portion of the catalyst is continuously withdrawn from the reactor and treated with hydrogen at a temperature of 800° F., being thereby at least partially purified of sulfur, and is returned through the conduit 20 and the conduit 3 to the lower part of the reactor.

At the same time the incoming synthesis gas is subjected to strict removal of sulfur compounds before being supplied to the reactor. It has been found impractical, in view of the many variable factors, to operate specifically on the basis of a predetermined rate of catalyst circulation through the sulfur removal step, or addition of sulfur to the catalyst mass, but it is sufficient that these factors can be adjusted on the basis of the composition and quantity of products issuing from pipe 6 in order to maintain substantially the optimum operation.

In place of the iron catalyst mentioned above other known iron catalysts may be employed together with other useful promoters such as oxides of thorium, magnesium, uranium and vanadium, and with suitable supporting materials such as diatomaceous earth, silica gel, Filtrols, etc. Preferably, the process is operated with a fluidized, powdered catalyst although, as indicated above, stationary catalysts are equally applicable provided that the optimum sulfur content of the synthesis gas is suitably maintained after attainment of the required condition.

Supported catalysts may be used in both fluidized and stationary beds. An example of a supported catalyst would be one comprising 32% iron, 64% diatomaceous earth and about 4% thorium and magnesium oxides.

While certain temperatures have been specifically referred to, it is contemplated that other temperatures may be employed depending upon the type of catalyst used and the products desired. Such temperatures may range from about 200 to 700° F. in the reactor 4 and 500 to 1000° F. in the regeneration tower 15.

The invention is also applicable to processes wherein catalyst is employed other than in a fluidized or fixed bed state as, for example, in the form of a mass of beads or pellets descending through a reaction tower counter-currently to a rising stream of reactant gases, the catalyst being suitably brought to the required level of sulfur content for reintroduction to the reaction zone. Likewise, in lieu of the arrangements shown, provision may be made for removing the catalyst powder from the top of the reactor 4 (filter element 5 being omitted), as is customary in systems employing overhead entrainment of catalyst with subsequent separation of catalyst powder and gases in cyclones or other suitable separators. The separated catalyst is then introduced into the regeneration tower and thence returned to the reaction vessel.

It is further contemplated that the conversion may be carried out in separate stages with or without recirculation of reaction products or any selected portion thereof.

Obviously many modifications and variations of the invention as set forth above may be made without departing from the spirit and scope thereof, and therefore only such limitations should be imposed as are indicated in the appended claims.

I claim:

1. The catalytic synthesis process involving the hydrogenation of carbon monoxide which comprises continuously passing into a reaction zone containing a synthesis catalyst comprising iron, under reaction conditions, a reactant feed comprising carbon monoxide and hydrogen while maintaining the sulfur content of said catalyst at a value sufficient to suppress the production of carbon dioxide in the process, but insufficient to substantially inhibit hydrocarbon formation.

2. The process for synthesizing hydrocarbons by the hydrogenation of carbon monoxide which comprises continuously passing a reactant feed comprising carbon monoxide and hydrogen with a substantial proportion of sulfur through a mass of catalyst containing iron maintained in a reaction zone under reaction conditions, said proportion of sulfur being sufficient to progressively increase the sulfur content of the catalyst mass, continuing the passage of said reactant feed until the formation of carbon dioxide by the synthesis reaction has been materially suppressed but prior to substantial impairment of the hydrocarbon-forming reaction, and thereafter continuing the passage of the reactant feed under conditions adapted to prevent material alteration in the sulfur content of the catalyst.

3. The process for synthesizing hydrocarbons by the hydrogenation of carbon monoxide which comprises continuously passing a reactant feed comprising carbon monoxide and hydrogen with a proportion of sulfur through a mass of catalyst containing iron maintained in a reaction zone under reaction conditions including an elevated pressure, said proportion of sulfur being sufficient to progressively increase the sulfur content of the catalyst mass, continuing the passage of said reactant feed until the formation of carbon dioxide by the synthesis reaction has been materially suppressed but prior to substantial impairment of the hydrocarbon-forming reaction, thereafter continually withdrawing a stream of catalyst from said reaction zone, removing sulfur from said withdrawn catalyst, recycling said desulfurized catalyst to the reaction zone and effecting said catalyst desulfurization at a rate approximating the rate at which sulfur is added to the catalyst from the reactant feed.

4. In the synthesis of hydrocarbons by the catalytic reduction of carbon monoxide with hydrogen in the presence of a catalyst comprising iron disposed in a reaction zone, wherein a synthesis gas comprising hydrogen and carbon monoxide is passed in contact with said catalyst under reaction conditions including a predetermined elevated temperature and an elevated pressure at which hydrocarbons are produced, the method of suppressing carbon dioxide formation which comprises introducing sulfur into contact with said iron catalyst until the catalyst assumes a sulfur content in the range above that minimum value at which the inhibition of carbon dioxide formation becomes noticeable but below the maximum value at which the said iron catalyst is poisoned with respect to the synthesis of hydrocarbons at said predetermined temperature, passing said synthesis gas in contact with said catalyst under said reaction conditions, continuously maintaining the sulfur content of said iron catalyst within said range, withdrawing effluent gases from contact with the catalyst, and recovering desired products of reaction therefrom.

5. The method according to claim 4, wherein the synthesis gas passed in contact with the catalyst contains sulfur in a proportion effective to add sulfur to the catalyst, and wherein a stream of catalyst is continually withdrawn from the reaction zone, sulfur is removed from the withdrawn catalyst, resulting desulfurized catalyst is recycled to the reaction zone, and said catalyst desulfurization is effected at a rate approximating that at which sulfur is added to the catalyst from the synthesis gas.

6. In the synthesis of hydrocarbons by the catalytic reduction of carbon monoxide with hydrogen in the presence of an iron catalyst in a reaction zone wherein a synthesis gas comprising hydrogen and carbon monoxide is passed in contact with said iron catalyst at a predetermined elevated temperature and an elevated pressure at which desired hydrocarbons are produced together with substantial quantities of undesired by-product carbon dioxide, the method of suppressing carbon dioxide formation which comprises passing into contact with said iron catalyst at said elevated temperature a synthesis gas containing a proportion of sulfur effective to progressively increase the sulfur content of said catalyst, continuing passage of said sulfur-containing synthesis gas in contact with said catalyst until the catalyst assumes a sulfur content within the range above that minimum value at which the inhibition of carbon dioxide formation becomes noticeable but below the maximum value at which said iron catalyst is poisoned with respect to the synthesis of hydrocarbons, thereafter continuing passage of sulfur-free synthesis gas in contact with the catalyst under said reaction conditions while continuously maintaining the sulfur content of said catalyst within said range, withdrawing effluent gases from contact with the catalyst and recovering desired products of reaction therefrom.

7. In the synthesis of hydrocarbons by the catalytic reduction of carbon monoxide with hydrogen in the presence of an iron catalyst in a reaction zone wherein a synthesis gas comprising hydrogen and carbon monoxide is passed in contact with said iron catalyst at a predetermined elevated temperature and an elevated pressure at which desired hydrocarbons are produced together with substantial quantities of undesired by-product carbon dioxide, the method of suppressing carbon dioxide formation which comprises passing into contact with said iron catalyst at said elevated temperature a synthesis gas containing a proportion of sulfur effective to progressively increase the sulfur content of said catalyst, continuing passage of said sulfur-containing synthesis gas in contact with said catalyst until the catalyst assumes a sulfur content within the range above that minimum value at which the inhibition of carbon dioxide formation becomes noticeable but below the maximum value at which said iron catalyst is poisoned with respect to the synthesis of hydrocarbons, thereafter continuing passage of said sulfur-containing synthesis gas in contact with the catalyst under said reaction conditions, continuously withdrawing catalyst from the reaction zone, removing sulfur from the withdrawn catalyst, recycling resulting desulfurized catalyst to the reaction zone and effecting said catalyst desulfurization at a rate approximating that at which sulfur is added to the catalyst from the synthesis gas.

8. The process according to claim 1, wherein the sulfur content of the catalyst is initially raised to said value by subjecting the catalyst, at an elevated temperature, to contact with a stream of feed gas containing a proportion of sulfur sufficient to progressively increase the sulfur content of the catalyst.

EDWIN T. LAYNG.

REFERENCES CITED

The following references are of record in the file of this patent:

UNITED STATES PATENTS

| Number | Name | Date |
| --- | --- | --- |
| 2,360,787 | Murphree | Oct. 17, 1944 |

FOREIGN PATENTS

| Number | Country | Date |
| --- | --- | --- |
| 322,284 | Great Britain | Dec. 29, 1929 |
| 509,325 | Great Britain | July 14, 1939 |